United States Patent
Atia et al.

(10) Patent No.: US 9,954,479 B1
(45) Date of Patent: Apr. 24, 2018

(54) MOUNTING APPARATUS TO SECURE SOLAR PANEL RAILS TO FLAT TILE ROOFS

(71) Applicants: Moti Atia, North Hollywood, CA (US); Netanel Levi, North Hollywood, CA (US)

(72) Inventors: Moti Atia, North Hollywood, CA (US); Netanel Levi, North Hollywood, CA (US)

( * ) Notice: Subject to any disclaimer, the term of this patent is extended or adjusted under 35 U.S.C. 154(b) by 0 days.

(21) Appl. No.: 15/667,421

(22) Filed: Aug. 2, 2017

Related U.S. Application Data

(60) Provisional application No. 62/369,922, filed on Aug. 2, 2016.

(51) Int. Cl.
| | |
|---|---|
| *A47G 29/02* | (2006.01) |
| *H02S 20/24* | (2014.01) |
| *H02S 30/10* | (2014.01) |
| *F24J 2/52* | (2006.01) |

(52) U.S. Cl.
CPC ............ *H02S 20/24* (2014.12); *F24J 2/5207* (2013.01); *F24J 2/5258* (2013.01); *H02S 30/10* (2014.12)

(58) Field of Classification Search
CPC .......... H02S 20/24; H02S 30/10; F24J 2/5207
USPC ................................. 248/237; 52/173.3, 713
See application file for complete search history.

(56) References Cited

U.S. PATENT DOCUMENTS

| | | | | |
|---|---|---|---|---|
| 8,453,986 B2* | 6/2013 | Schnitzer | ............... | F24J 2/5203 126/623 |
| 8,806,815 B1* | 8/2014 | Liu | ..................... | H01L 31/0422 248/295.11 |
| 8,839,575 B1* | 9/2014 | Liu | ..................... | H01L 31/0422 248/295.11 |
| 8,875,455 B1* | 11/2014 | Yang | ..................... | F24J 2/5245 126/623 |
| 8,938,932 B1* | 1/2015 | Wentworth | ............. | H02S 20/23 52/173.3 |
| 9,595,911 B2* | 3/2017 | McPheeters | ............ | H02S 20/23 |
| 9,647,433 B2* | 5/2017 | Meine | ..................... | H02S 40/36 |
| 2016/0308486 A1* | 10/2016 | Atia | ......................... | H02S 20/23 |

* cited by examiner

*Primary Examiner* — Gwendolyn W Baxter
(74) *Attorney, Agent, or Firm* — Plager Schack LLP; Mark H. Plager

(57) ABSTRACT

A mounting apparatus to secure a pair of solar panel rails to a flat tile roof and minimize penetrations or damage to the roof's rafter is provided. The mounting apparatus includes a lower hook assembly with a plurality of arm members continuously connected together, the plurality of arm members having a first end coupled to the rafter of the flat tile roof and a second end, and an upper arm assembly coupled to the second end of the plurality of arms of the lower hook assembly, the upper arm assembly having a generally U-shaped member comprising a first symmetric half member and a second symmetric half member, each symmetric half member having a slot to receive a fastener that secures one of the pair of solar panel rails thereto, thereby permitting the mounting apparatus to support the pair of solar panel rails above the flat tile roof.

10 Claims, 3 Drawing Sheets

MOUNTING APPARATUS TO SECURE SOLAR PANEL RAILS TO FLAT TILE ROOFS

RELATED APPLICATION

The application claims priority to provisional patent application U.S. Ser. No. 62/369,922 filed on Aug. 2, 2016, the entire contents of which is herein incorporated by reference.

BACKGROUND

The embodiments herein relate generally to mounting apparatuses used to secure a solar panel rail to a roof.

Solar panels are generally positioned adjacent to each other and secured to the building's roof by rails and fasteners. In many instances, each solar panel is secured within a frame that is coupled to the building's roof by a plurality of solar panel rails and mounting devices. Each solar panel rail is mechanically fastened to a mounting device, which is coupled to a rafter of the roof by mechanical fasteners such as screws or bolts.

Current solar panel rail mounting devices are designed to support a single rail. Since each solar panel rail is coupled to a separate mounting device, the number of total penetrations into the roof's rafters by mechanical fasteners is increased. These added penetrations into the roof increase the amount of labor required to install the solar panels on the roof, the chance of leakage in the roof from precipitation, and likelihood of damage suffered by the roof's structural elements such as the rafters and/or other components.

As such, there is a need in the industry for a mounting apparatus that overcomes the limitations of the prior art, which permits the attachment of solar panel rails to flat tile roofs. There is a further need for the mounting apparatus to support a pair of solar panel rails thereon to minimize the amount of penetration and/or damage to the roof upon installation.

SUMMARY

A mounting apparatus to secure a pair of solar panel rails to a flat tile roof and minimize penetrations or damage to a rafter of the roof is provided. The mounting apparatus is configured to permit the pair of solar panel rails to support a pair of adjacent solar panels thereon. The mounting apparatus comprises a lower hook assembly comprising a plurality of arm members continuously connected together, the plurality of arm members comprising a first end coupled to the rafter of the flat tile roof and a second end, and an upper arm assembly coupled to the second end of the plurality of arms of the lower hook assembly, the upper arm assembly comprising a generally U-shaped member comprising a first symmetric half member and a second symmetric half member, each symmetric half member of the first and second symmetric half members comprising a slot configured to receive a fastener that secures one of the pair of solar panel rails thereto, thereby permitting the mounting apparatus to support the pair of solar panel rails above the flat tile roof.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
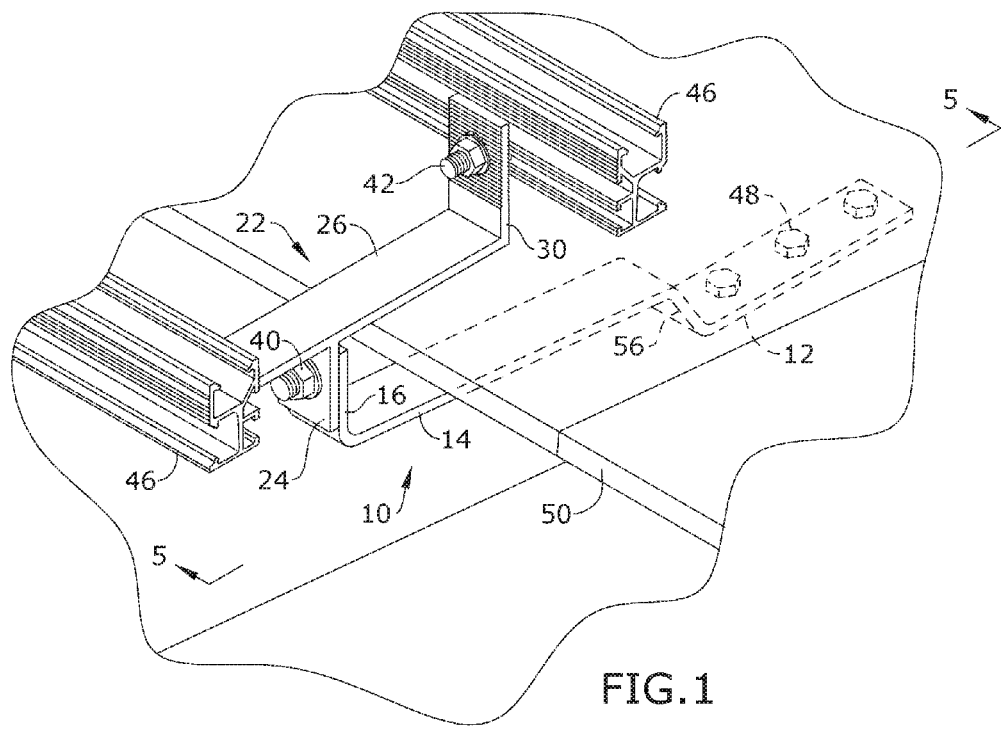
FIG. 1 depicts a perspective view of certain embodiments of the mounting apparatus shown in use.
Figure 2:
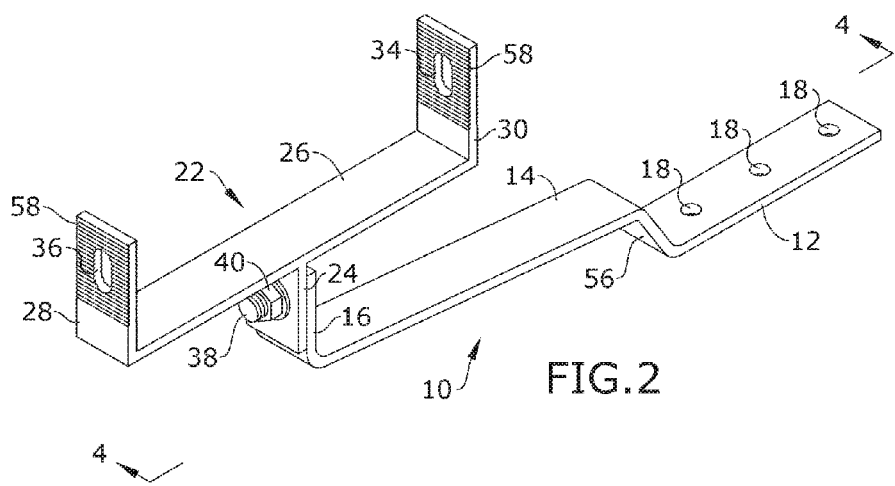
FIG. 2 depicts a perspective view of certain embodiments of the mounting apparatus.
Figure 3:
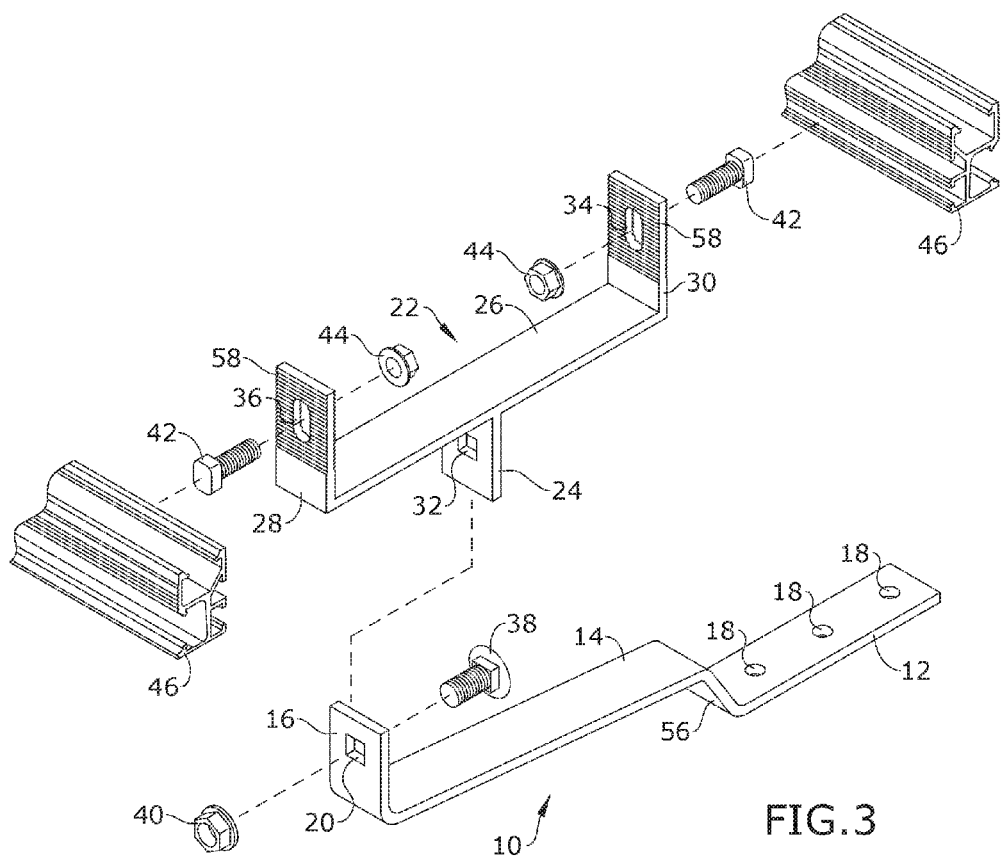
FIG. 3 depicts an exploded view of certain embodiments of the mounting apparatus.

As depicted in FIGS. 1-3, the mounting apparatus is configured to secure a pair of solar panel rails 46 above a roof comprising a plurality of flat tiles 50. In one embodiment, the pair of solar panel rails 46 is designed to support side portions of a pair of solar panels (not shown) positioned adjacent to each other. In certain embodiments, each solar panel may be disposed within a frame (not shown) that is secured to solar panel rail 46 by a fastener such as a clamp, bolt, or the like. It shall be appreciated that each solar panel may be coupled to one or more additional rails throughout the panel to provide additional support when securing the solar panel to the roof.

In certain embodiments, the mounting apparatus generally comprises lower hook assembly 10 and upper arm assembly 22 coupled together. The mounting apparatus is preferably made from 304 stainless steel. However, alternative materials may be used instead. Lower hook assembly 10 is coupled to the roof by screws 48. Upper arm assembly 22 is coupled to the pair of solar panel rails 46 by T-bolts 42 and nuts 44.

As depicted in FIGS. 1-4, lower hook assembly 10 comprises first arm member 12 continuously connected to second arm member 56 continuously connected to third arm member 14 continuously connected to fourth arm member 16. First arm member 12 comprises a plurality of screw holes 18 configured to receive screws 48. Each screw hole 18 should be sufficiently large to receive screw 48, which is preferably a ⅜" screw. However, the size of screw holes 18 and screws 48 may vary. Although first arm member 12 of lower hook assembly 10 comprises three screw holes 18, it shall be appreciated that any alternative number of screw holes 18 may be disposed thereon. Fourth arm member 16 of lower hook assembly 10 comprises bolt hole 20, which is configured to receive connector bolt 38.

Figure 4:
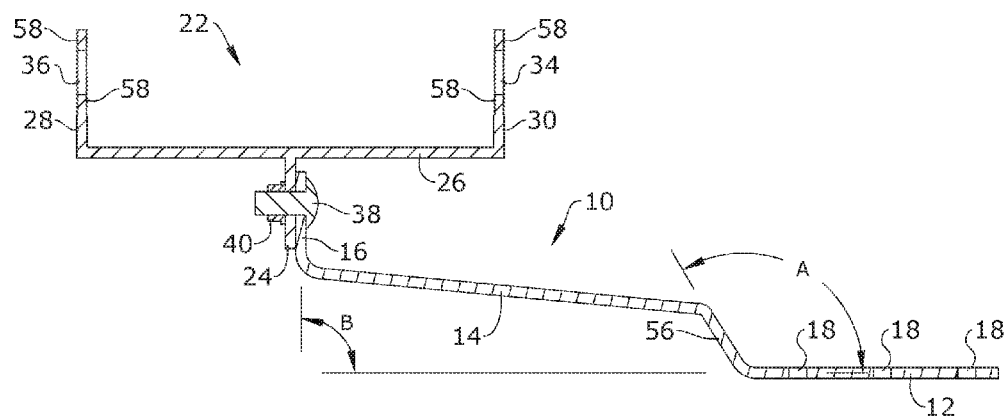
FIG. 4 depicts a section view of certain embodiments of the mounting apparatus taken along line 4-4 in FIG. 2.

As depicted in FIG. 4, first, second, third and fourth arm members 12, 56, 14, 16 are oriented in a particular configuration. A first longitudinal axis of first arm member 12 is oriented an angle A relative to a second longitudinal axis of second arm member 56. In a preferred embodiment, angle A is within the approximate range of 110.6-116.6 degrees. A fourth longitudinal axis of fourth arm member 16 is oriented an Angle B relative to the first longitudinal axis of first arm member 12. In a preferred embodiment, angle B is within the approximate range of 87-93 degrees.

As depicted in FIGS. 2-3, upper arm assembly 22 comprises a generally U-shaped member comprising a pair of symmetric half members continuously connected together. Specifically, the U-shaped member comprises horizontal arm 26, first upright arm 28 and second upright arm 30. Arm tab 24 is continuously connected to the bottom of horizontal arm 26.

First upright arm 28 comprises first slot 36 and second upright arm 30 comprises second slot 34. Each of first slot 36 and second slot 34 is sufficiently large to receive T-bolt 42, which is configured to be coupled to nut 44. In one embodiment, the inner and outer surfaces of first and second upright arms 28, 30 comprise a plurality of grooves 58 that surround first and second slots 36, 34. Arm tab 24 comprises bolt hole 32, which is configured to receive connector bolt 38.

Figure 5:
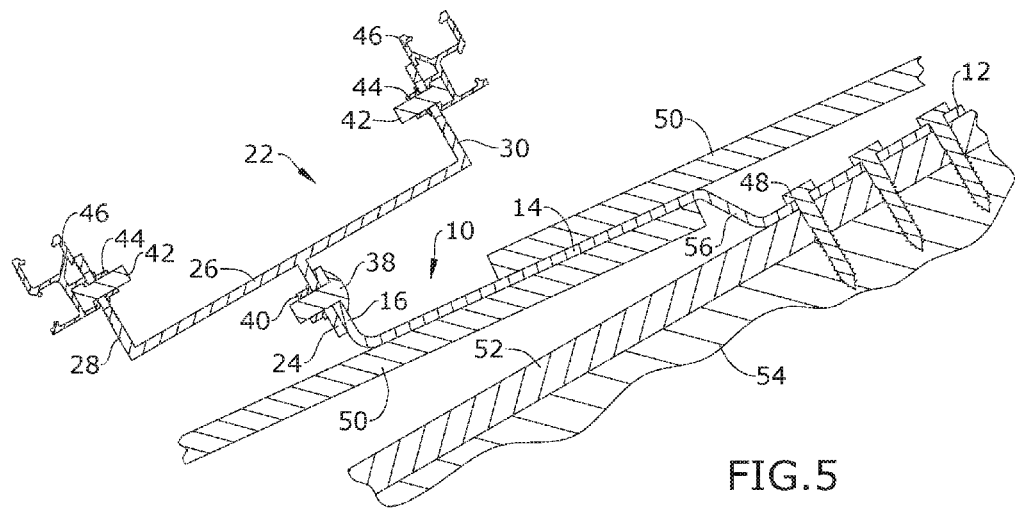
FIG. 5 depicts a section view of certain embodiments of the mounting apparatus taken along line 5-5 in FIG. 1.

In operation, one or more of the following steps may be performed to secure the mounting apparatus to the pair of solar panel rails 46 and the roof. First, a chalk line is generally disposed on the roof across flat tiles 50 to indicate the general location where solar panel rails 46 will be installed. One of the plurality of flat tiles 50 present beneath or near the chalk line is removed from the roof. As depicted in FIG. 5, this exposes portions of rafter 54 and weatherproof layer 52 of the roof. An instrument such as a stud finder may be used to directly locate the position of rafter 54. Once located, three ¼" pilot holes are drilled through weatherproof layer 52 and rafter 54. The ¼" drilled holes are backfilled with a sealant such as RainBuster 850.

Lower hook assembly 10 is disposed on waterproof layer 52 such that screw holes 18 of first arm member 12 are aligned with the ¼" drilled holes in weatherproof layer 52 and rafter 54. Screws 48 are disposed through screw holes 18 of lower hook assembly 10 and the pilot holes in waterproof layer 52 and rafter 54. The removed flat tile 50 is returned to the original position. Once this is completed, adjacent flat tiles 50 should cover a portion of third arm member 14 on both the top and bottom surfaces.

Upper arm assembly 22 is coupled to lower hook assembly 10 by connector bolt 38 and nut 40. More specifically, connector bolt 38 is disposed through bolt hole 20 of lower hook assembly 10 and bolt hole 32 of upper arm assembly 22 and secured in place by nut 40. As depicted in FIGS. 1 and 5, a pair of solar panel rails 46 are coupled to upper arm assembly 22. A first solar panel rail 46 is coupled to first upright arm 28 of upper arm assembly 22 by T-bolt 42 and nut 44. T-bolt 42 extends through first slot 36 in first upright arm 28 and is secured in place by nut 44. Similarly, a second solar panel rail 46 is coupled to second upright arm 30 of upper arm assembly 22 by T-bolt 42 and nut 44. T-bolt 42 extends through second slot 34 in second upright arm 30 and is secured in place by nut 44. Although the figures depict solar panel rails 46 coupled to the outer surfaces of first and second upright arms 28, 30, it shall be appreciated that solar panel rails 46 can alternatively be coupled to the inner surfaces of first and second upright arms 28, 30.

The mounting apparatus is beneficial because it can support a pair of solar panel rails 46 thereon while limiting the number of penetrations to three screws 48 at a single location in rafter 54. This minimizes leaks, damage and labor/maintenance costs of the flat tiled roof.

It shall be appreciated that multiple mounting apparatuses may be used to secure the solar panel rails to the roof as desired. It shall be appreciated that the components of the mounting apparatus described in several embodiments herein may comprise any alternative known materials in the field and be of any color, size and/or dimensions. It shall be appreciated that the components of the mounting apparatus described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A mounting apparatus to secure a pair of solar panel rails to a flat tile roof and minimize penetrations or damage to a rafter of the roof, the mounting apparatus configured to permit the pair of solar panel rails to support a pair of adjacent solar panels thereon, the mounting apparatus comprising:
    a lower hook assembly comprising a plurality of arm members continuously connected together, the plurality of arm members comprising a first end coupled to the rafter of the flat tile roof and a second end; and
    an upper arm assembly coupled to the second end of the plurality of arms of the lower hook assembly, the upper arm assembly comprising a generally U-shaped member comprising a first symmetric half member and a second symmetric half member, each symmetric half member of the first and second symmetric half members comprising a slot configured to receive a fastener that secures one of the pair of solar panel rails thereto, thereby permitting the mounting apparatus to support the pair of solar panel rails above the flat tile roof.

2. The mounting apparatus of claim 1, wherein the plurality of arm members of the lower hook assembly comprises a first arm member continuously connected to a second arm member continuously connected to a third arm member continuously connected to a fourth arm member, wherein the fourth arm member is coupled to the upper arm assembly and the first arm member is coupled to the rafter of the flat tile roof.

3. The mounting apparatus of claim 2, wherein the first arm member comprises a first longitudinal axis and the second arm member comprises a second longitudinal axis, wherein the first longitudinal axis is oriented within an approximate range of 110.6-116.6 degrees relative to the second longitudinal axis.

4. The mounting apparatus of claim 3, wherein the fourth arm member comprises a fourth longitudinal axis oriented within an approximate range of 87-93 degrees relative to the first longitudinal axis.

5. The mounting apparatus of claim 4, further comprising a plurality of holes disposed in the first arm member of the plurality of arm members of the lower hook assembly, each hole in the plurality of holes configured to receive a screw disposed therethrough to secure the lower hook assembly to the rafter of the flat tile roof.

6. The mounting apparatus of claim 5 further comprising a bottom tab coupled to the generally U-shaped member of the upper arm assembly, the bottom tab coupled to the fourth arm member of the lower hook assembly.

7. The mounting apparatus of claim 6, wherein the bottom tab of the upper arm assembly is coupled to the fourth arm member of the lower hook assembly by a bolt and a nut.

8. The mounting apparatus of claim 7, further comprising a plurality of grooves disposed on a portion of an inner surface and a portion of an outer surface of each symmetric half member in the first and second half members of the upper arm assembly.

9. The mounting apparatus of claim 8, wherein the slot of each symmetric half member in the first and second half members is surrounded by the plurality of grooves.

10. The mounting apparatus of claim 9, wherein the upper arm assembly and lower hook assembly are made from 304 stainless steel.

\* \* \* \* \*